2 Sheets—Sheet 1.

G. B. HILL.
Machine for Cutting and Punching Nut-Blanks.

No. 199,546. Patented Jan. 22, 1878.

WITNESSES
Robert Everett
George E. Upham

INVENTOR.
George B. Hill.
Gilmore, Smith & Co.
ATTORNEYS.

G. B. HILL.
Machine for Cutting and Punching Nut-Blanks.
No. 199,546. Patented Jan. 22, 1878.
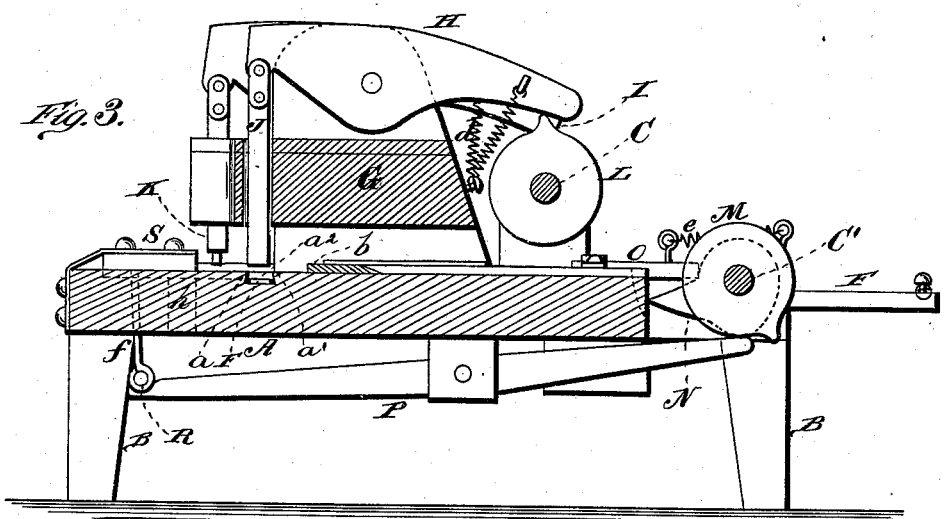
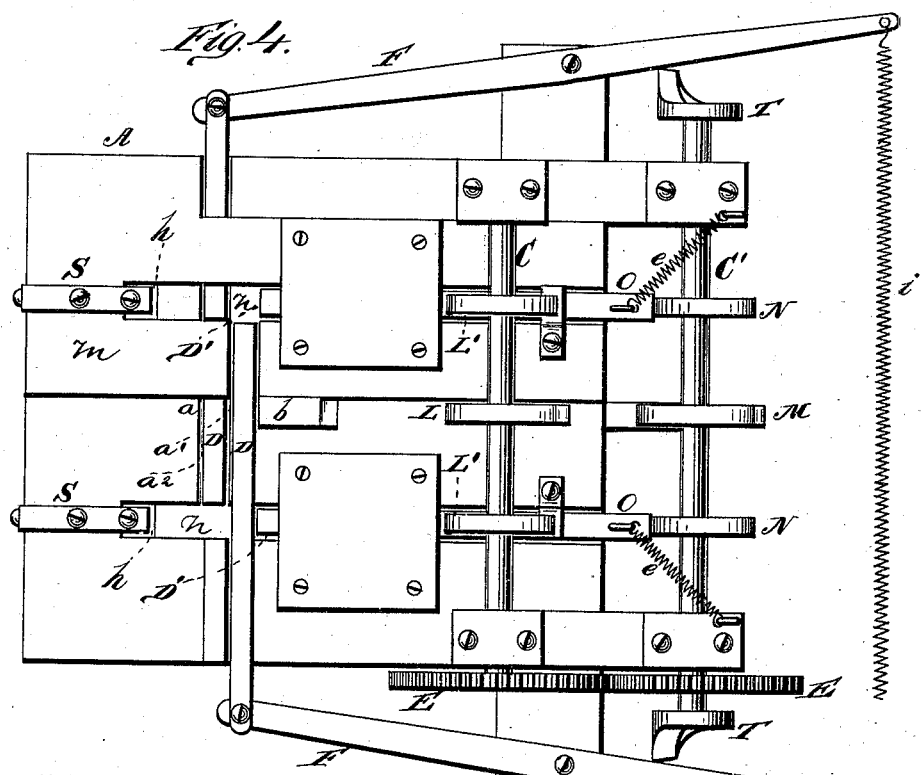
WITNESSES
INVENTOR.
George B. Hill.
ATTORNEYS.

UNITED STATES PATENT OFFICE.

GEORGE B. HILL, OF DETROIT, MICHIGAN, ASSIGNOR TO THE MICHIGAN BOLT AND NUT WORKS, OF SAME PLACE.

IMPROVEMENT IN MACHINES FOR CUTTING AND PUNCHING NUT-BLANKS.

Specification forming part of Letters Patent No. 199,546, dated January 22, 1878; application filed January 15, 1878.

*To all whom it may concern:*

Be it known that I, GEORGE B. HILL, of Detroit, in the county of Wayne and State of Michigan, have invented a new and valuable Improvement in Machines for Cutting Nut-Blanks; and I do hereby declare that the following is a full, clear, and exact description of the construction and operation of the same, reference being had to the annexed drawings, making a part of this specification, and to the letters and figures of reference marked thereon.

Figure 1:
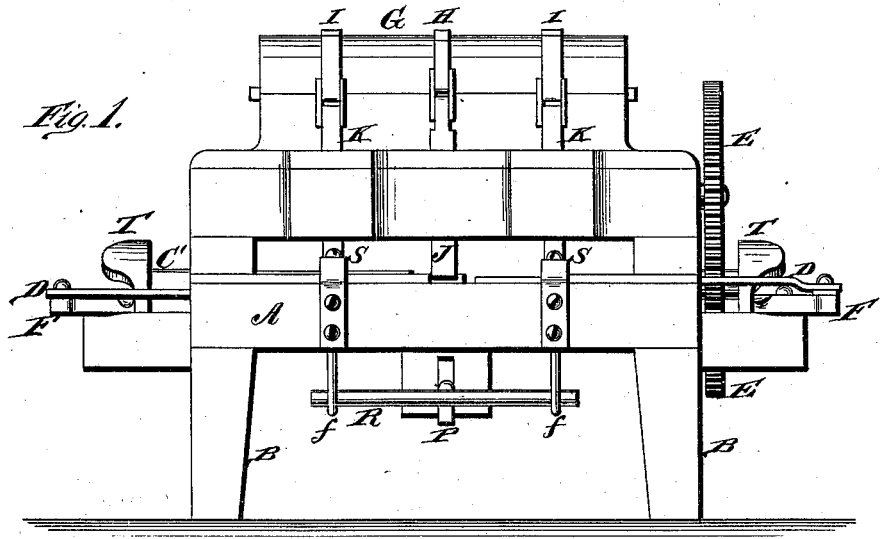
Figure 2:
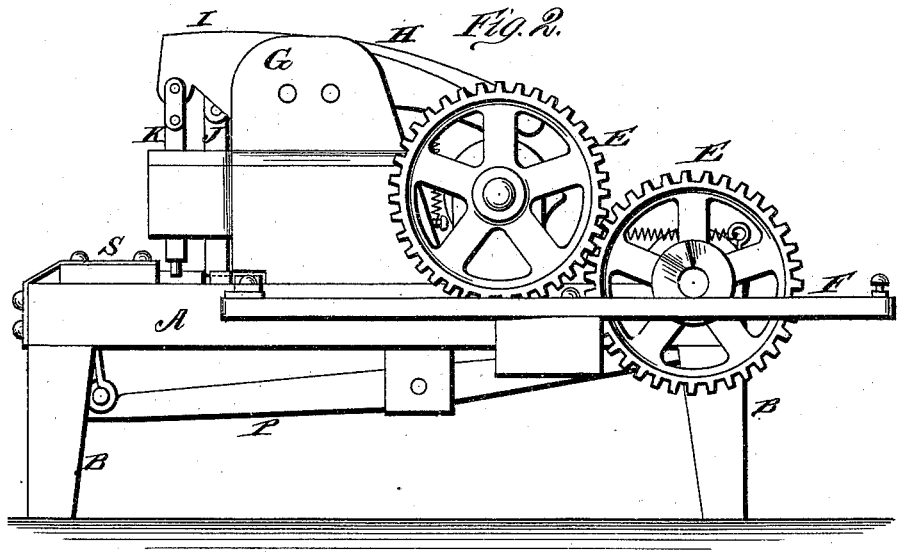

Figure 1 of the drawings is a representation of a front view of my machine for cutting nut-blanks. Fig. 2 is a side view. Fig. 3 is a longitudinal vertical section, and Fig. 4 is a plan view with the housing removed.

The nature of my invention consists in the construction and arrangement of a machine for making two nuts simultaneously, as will be hereinafter more fully set forth.

The annexed drawings, to which reference is made, fully illustrate my invention.

A represents the bed of the machine, supported upon suitable legs B B, and having on top suitable bearings, in which the shaft C is placed. A similar shaft, C', is placed in bearings at the rear end of the bed, and said two shafts are connected by gear-wheels E E. Power may be applied to either of these shafts in any well-known manner.

In the top of the bed A, at a suitable point, are secured two shear-blades, $a$ $a^1$, a suitable distance apart, and forming a groove, $a^2$, between them. Back of the blade $a^1$ is a stop, $b$, which is the same distance from the said blade $a^1$ as the distance between the edges of the two blades $a$ $a^1$. In the groove $a^2$ works an arm, D, pivoted at its outer end to the front end of a lever, F. A similar lever, F, is arranged on the opposite side of the machine, with an arm, D, connected to the same, and working inward in front of the stop $b$, the two arms D D working simultaneously in opposite directions, as hereinafter described.

In a housing, G, on top of the bed are pivoted three levers, one, H, in the center, and one, I, on each side thereof. To the front end of the center lever H is pivoted a plunger, J, the lower end of which is made square, and forms the shear for cutting the metal bar between the edges of the blades $a$ $a^1$. To the front ends of the levers I I are, in like manner, connected punches K K, the said punches and plunger or shear passing through suitable guides formed in the housing. The rear ends of the levers H and I I are connected to suitable springs $d$ $d$, to hold said ends down upon cams L and L' L', respectively, which cams are secured upon the shaft C. On the shaft C' are secured three cams, M and N N. The side cams N N are for the purpose of pushing forward slides O O, to the front ends of which arms D' D' are attached, said arms operating in a line with the punches K K at right angles to the arms D D. The slides O O are held against the cams and drawn back by means of springs $e$ $e$. The center cam M operates against the rear end of a lever, P, pivoted under the bed. To the front end of this lever is attached a cross-bar, R, having two rods, $f f$, passing upward through the bed and against spring-bars S S placed in grooves in the bed A. These spring-bars are in line with the arms D' D', and their inner ends close openings $h$ $h$ in the bed. On the ends of shaft C' are secured cams T, for operating the levers F F, which are pivoted on the ends of a cross-bar outside of the sides of the bed A. The rear ends of these levers F F are connected by a spring, $i$, as shown.

The operation of the machine is as follows: The bar from which the blanks are to be cut is laid against a guide, $m$, on the bed, and up to the stop $b$, when the plunger J, by the action of the cam L on the lever H, is made to descend, and cuts two blanks at one time—that is, it cuts one blank between the edges of the blades $a$ $a^1$, leaving the inner end of the bar against the stop as another blank. These two blanks are in square form and of the same size. The plunger J now ascends, and, by the action of the cams T, the levers F are turned to move the arms D D in opposite directions. These arms move the two blanks directly in front of the two arms D' D', and are then at once retracted. The arms D' D' now, by the action of the cams N N, are moved forward, and push the blanks in between guides $n$ $n$ against the bars S S. The blanks are thus held, as it were, in dies, and the arms D' then remain stationary, while the punches K K, by the action of the cams L' on the levers I, descend and punch the holes in the blanks. The punches at once ascend again, and the cam M, operating on the lever P, causes the spring-arms S to rise and uncover the holes h. Simultaneously therewith the arms D' D' resume their forward movement and push the nuts far enough ahead, so that they will fall through the holes h h. The arms D' D' are then retracted, and the cam M allows the spring-bars S to resume their former positions. During the latter portion of this operation, as above described, the metal bar is again pushed up against the stop b, and the plunger J descends to cut two more blanks, so that before the first two blanks have left the machine other two blanks have been cut, and are ready to be moved to the punches.

The mechanical means (such as cams, springs, &c., as described) for operating the various working parts can be changed in many ways; hence I do not confine myself to such means.

On the same principle the machine may be arranged to cut and manipulate more than two blanks at the same time.

What I claim as new, and desire to secure by Letters Patent, is—

1. The plunger J, shear-blades $a^1 a^1$, and arms D D D' D', combined substantially as and for the purposes specified.

2. In a nut-machine, the combination of the plunger J, shear-blades $a^1 a^1$, stop b, arms D D and D' D', with operating mechanism, constructed and arranged substantially as shown and described.

3. In a nut-machine, the combination of the plunger J, shear-blades $a^1 a^1$, stop b, arms D D and D' D', with punches K K, substantially as described.

4. The spring-arms S S, guides n n, and arms D' D', for holding the blanks while being punched, as herein set forth.

In testimony that I claim the above I have hereunto subscribed my name in the presence of two witnesses.

GEO. B. HILL.

Witnesses:
JOHN F. BLACKMAR,
JAS. J. SHEEHY.